United States Patent Office 3,439,039
Patented Apr. 15, 1969

3,439,039
DIFLUOROAMINO ALKANOLS AND THEIR PREPARATION
Robert C. Petry and Samuel F. Reed, Jr., Huntsville, Ala., assignors to Rohm & Haas Company, Philadelphia, Pa., a corporation of Delaware
No Drawing. Filed Oct. 24, 1961, Ser. No. 147,712
Int. Cl. C07c 69/62, 91/02, 95/02
U.S. Cl. 260—584    14 Claims This invention concerns alcohols containing difluoramino, $NF_2$, group. More specifically, it concerns alcohols containing at least two difluoramino groups.

The alcohols of the present invention are prepared by the addition of tetrafluorohydrazine, $N_2F_4$, to ethylenically unsaturated alcohols. The $N_2F_4$ can be added to the alcohol itself, but it is preferred to protect the hydroxyl group by esterification before reacting with $N_2F_4$. After the reaction with $N_2F_4$, the difluoramino ester is hydrolyzed to the corresponding alcohol or is freed by transesterification.

The difluoramino alkanols of the present invention can be represented by the formula (1) 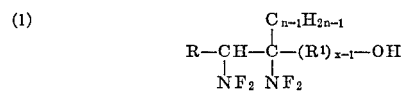

in which R is selected from the group consisting of hydrogen and lower alkyl, and $n$ is an integer from 1 to 5, and $R^1$ is selected from the group consisting of methylene and lower alkylene, $x$ is an integer from 1 to 5, and (2) the compound of the formula

The alcohols of the present invention are of value as intermediates for the manufacture of high energy polymerizable monomers which are of value as binders for propellant charges or grains. They may be reacted with unsaturated acyl halides or anhydrides, such as acrylic or methacrylic, to give high energy polymerizable acrylates or methacrylates. They may be reacted with unsaturated isocyanates such as vinyl, acryloyl or methacryloyl to give the corresponding polymerizable carbamates.

When employed as binders for propellant charges, the polymerizable monomers set forth hereinbefore give grains with excellent physical properties, good case bonding and high specific impulse.

Tetrafluorohydrazine, $N_2F_4$, can be prepared by the method of Colburn et al., J.A.C.S. 80, 5004 (1958), and this information is incorporated herein by reference. This process comprises the thermal reaction of nitrogen trifluoride, $NF_3$, with various fluorine acceptors, such as copper, bismuth, arsenic, antimony, and stainless steel. Typical reaction conditions are a temperature of from 375–450° C. and the reaction time will vary with the size of the flow reactor. Flow reactors are the preferred reaction equipment.

The alcohols used as reactants in the present invention are aliphatic alcohols containing at least one double bond and typical examples are vinyl alcohol (which does not exist as such but can be used as the ester as hereinafter set forth), allyl alcohol, methallyl alcohol, 6-hexen-1-ol, 1-ethyl-2-propen-1-ol, divinyl carbinol, 2-buten-1-ol and 1-methyl-2-buten-1-ol. Higher alkenols can also be employed, but in general it is difficult to purify the difluoramino derivatives since they tend to decompose on distillation.

It has been found that better yields are obtained and more straightforward reactions occur when the hydroxyl group is protected by esterification prior to the reaction with $N_2F_4$. The formate and acetate esters may be employed and are readily prepared by conventional methods.

A particularly preferred ester of these alkenols is the trifluoroacetate, since it is readily hydrolyzed to the acid and the alcohol is readily recovered. While conventional acid or alkaline hydrolysis can be employed, these methods are not preferred. It is preferred to release the alcohol by transesterification of the trifluoroacetate with methanol. Other lower alkanols can be employed for the transesterification reaction. The trifluoroacetates of the alkenols can be prepared by the traditional esterification procedures, but a preferred method comprises reacting trifluoroacetic anhydride with the alcohol in the presence of a tertiary amine. It is preferred to carry out the reaction in a solvent, typical of which is diethyl ether. This process results in high yields of high purity products.

The addition reaction of $N_2F_4$ to the unsaturated trifluoracetic ester can be carried out at temperatures in the range of 50 to 300° C. with the preferred range being 80 to 100° C. The reaction time will vary with the temperatures, but at approximately 100° C. the reaction time was from about 5 to about 8 hours.

Although theoretically the molar ratio for the reaction should be 1:1, it is preferred to use an excess of tetrafluorohydrazine in order to increase the yields of the desired difluoramino alcohols. Thus, the molar ratio of trifluoracetic ester to $N_2F_4$ can be from about 1 to 1.5 to 1 to 5.

Although, as indicated before, the resulting bis(difluoramino)trifluoracetate can be hydrolyzed with ether acid or alkali, this is not preferred since some decomposition invariably occurred. It is preferred to free the bis(difluoramino)alkanol by transesterification using a lower alkanol, preferably methanol. This reaction can be carried out at about 50° to 85° C., with 65° to 70° C. being the preferred range. In order to facilitate the reaction, it is preferred to use an excess of methanol and a molar ratio of ester to methanol of 1 to 1.5 to 1 to 3 is employed.

The addition of $N_2F_4$ to alkenyl trifluoroacetates can be effected by batch or continuous processes. Example I gives a typical description of batch process.

The continuous processes are conducted in a flow reactor and involves the passage of the alkenyl ester, preferably the trifluoroacetate, an excess of $N_2F_4$, and an inert gas such as helium or nitrogen through a heated copper or stainless steel reactor, generally in the form of a coiled tube, passing the effluent through a series of cold traps and recovering the addition product from the cold traps. The temperature of the reactor may be varied from 50° C. to 300° C. depending on the design of the reactor, the nature of the ester and the retention time.

Typical reaction data appear in Example III.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

Reaction of allyl trifluoroacetate with tetrafluorohydrazine

To a one-liter stainless steel evacuated bomb, cooled externally in a liquid nitrogen bath, was charged 7.7 grams (0.05 mole) allyl trifluoroacetate (previously degassed) and 10.4 grams (0.1 mole) 98% tetrafluorohydrazine using a vacuum rack for the transfer of reactants. The bomb was allowed to warm to ambient temperature, then placed in an oil bath and heated to 100° C. for a period of five hours during which time the pressure dropped from a maximum of 56 p.s.i. to 26 p.s.i. The initial ambient pressure was 37 p.s.i.; the final ambient pressure was 9 p.s.i. After cooling to ambient temperature, the contents of the bomb were removed under vacuum into a series of cold traps located on a vacuum rack. The product fraction was collected on a Dry-Ice-acetone cooled trap. The liquid fraction obtained from this trap was distilled to give 10.76 grams (83%) of 2,3-bis(difluoroamino)propyl trifluoroacetate, B.P. 55–58° C. (16 mm.); $n_D^{20}$ 1.3540.

*Analysis.*—Calculated for $C_5H_5F_7N_2O_2$: C, 23.21%; H, 1.94%; F, 51.60%; N, 10.85%. Found: C, 23.42%; H, 2.15%; F, 50.70%; N, 12.23%.

Transesterification of 2,3-bis(difluoramino)propyl trifluoroacetate with methanol To a 100 ml. round-bottom flask fitted with magnetic stirrer and distillation assembly was introduced 59.5 g. (0.21 mole) of 2,3-bis(difluoraminopropyl)trifluoroacetate and 25 ml. of anhydrous methanol. The flask was heated intermittently by means of a 65–70° C. hot water bath during a period of three hours. A total of 26.0 grams of methyl trifluoroacetate (96%) distilled from the reaction mixture. The remaining residue was distilled at reduced pressure to give 30.5 grams (89%) of 2,3-bis-(difluoramino)propanol-1, B.P. 44° C. (3 mm.) The infrared spectrum showed characteristic absorption at 2.92μ (—OH) and the 10–12μ region (—NF$_2$).

EXAMPLE II

The reaction of 14.0 grams (0.1 mole) vinyl trifluoroacetate with 15.6 grams (0.15 mole) tetrafluorohydrazine in a one-liter stainless steel bomb at 100° C. for a period of six hours gave 16.42 grams (67%) of 1,2-bis(difluoroamino)ethyl trifluoroacetate, B.P. 41–42° C. (20 mm.).

*Analysis.*—Calculated for $C_4H_3F_7N_2O_2$: C, 19.66%; H, 1.23%; F (hydr.), 31.06%; N, 11.46%. Found: C, 20.03%; H, 1.31%; F, 31.08%; N, 11.24%.

Thus, a number of unsaturated alkyl trifluoroacetates have been reacted with tetrafluorohydrazine under static bomb conditions to give the bis(difluoraminoalkyl)trifluoroacetates. The data on these compounds are included in Table I.

From the bis(difluoroamino)alkyl trifluoroacetates have been prepared the corresponding bis(difluoramino) alkanols by transesterifying the esters with anhydrous methanol. Several examples of this reaction are presented below and in Tables I and II.

EXAMPLE III

EXPERIMENTAL DATA ON TETRAFLUOROHYDRAZINE ALLYL TRIFLUOROACETATE FLOW REACTIONS

| Allyl trifluoroacetate (g.) | Flow rates (cc./min.) allyl trifluoroacetate (gas) | N$_2$F$_4$ | Helium | ° C. | Time (min.) | Residence time (min.) | Yield, percent |
|---|---|---|---|---|---|---|---|
| 63.4 | 47.3 | 47.3 | 25 | 175 | 265 | 14 | 39 |
| 21.5 | 47.3 | 47.3 | 10 | 178 | 75 | 15 | 29 |
| 17.6 | 47.3 | 47.3 | 30 | 177 | 30 | 13 | |
| 10.0 | 24.4 | 24.4 | 28 | 174 | 60 | 25 | 37 |
| 21.5 | 19.7 | 19.7 | 14 | 179 | 165 | 31 | 38 |
| 20.3 | 47.3 | 47.3 | 43 | 201 | 70 | 14 | 50 |
| 22.6 | 47.3 | 24.0 | 20 | 177 | 75 | 19 | 32 |
| 22.6 | 47.3 | 47.3 | 25 | 201 | 72 | 14 | 46 |
| 22.6 | 47.3 | 47.3 | 25 | 226 | 55 | 14 | 39 |
| 56.5 | 98.5 | 98.5 | 75 | 202 | 92 | 6.1 | 48 |
| 56.5 | 98.5 | 98.5 | 75 | 202 | 88 | 6.1 | 43 |
| 56.5 | 98.5 | 98.5 | 75 | 200 | 69 | 6.1 | |

Another preparative route to bis(difluoramino) alcohols which has been found to be attractive in certain instances is the direct reaction of tetrafluorohydrazine with alkenols in solution at sub-atmospheric pressures. It is also effective at super atmospheric pressures.

TABLE I.—EXPERIMENTAL DATA ON THE TRANSESTERIFICATION OF BIS-DIFLUORAMINO ALKYL TRIFLUOR ACETATES WITH METHANOL

| No. | Bis-difluoramino alkyl trifluoroacetate (g.) | Methanol (ml.) | Methyl trifluoroacetate, g.(percent) | Bis-difluoramino alcohol, g. (percent) |
|---|---|---|---|---|
| 1 | 2, 3-bis (difluoramino) 2-methyl trifluoroacetate (25.4) | 25 | 9.65 (81) | 2, 3-bis (difluoramino) 2-methylpropanol-1, 11.89 (73). |
| 2 | 2, 3-bis (difluoramino) butyl trifluoroacetate (9.86). | 10 | 4.10 (88) | 2, 3-bis (difluoramino) butanol-1, 4.97 (78). |
| 3 | 1, 2-bis (difluoramino)-pentan-3-yl trifluoroacetate (7.50). | 7 | 3.25 (97) | 1, 2-bis (difluoramino) pentanol-3, 5.79 (91). |
| 4 | 1, 2-bis (difluoramino) pentan-4-en-3-yl trifluoroacetate (7.68). | 10 | 3.13 (90) | 1, 2-bis (difluoramino) pent-4-enol-3, 4.75 (93). |
| 5 | 1, 2-bis (difluoramino) pentan-4-en-3-yl trifluoroacetate (8.49). | 10 | 2.59 (67) | 1, 2-bis (difluoramino) pent-4-enol-3, 3.67 (65). |
| 6 | 1, 2-bis (difluoramino) pentan-4-en-3-yl trifluoroacetate (16.32). | 20 | 5.19 (70) | 1, 2-bis (difluoramino) pent-4-enol-3, 9.93 (91). |
| 7 | 5, 6-bis(difluoramino) hexanyl trifluoroacetate 20.0 g. | 20 | 8.21 (96) | 5, 6-bis (difluoramino) hexanol-1 11.88 (79). |
| 8 | 1, 2-bis (difluoramino) ethyl trifluoroacetate, 6.2 g. | 10 | 3.06 (94) | 1, 2-bis (difluoramino) ethanol 3.81 (87). |

TABLE II.—CHARACTERIZATION DATA ON BIS-DIFLUORAMINO ALCOHOLS

| Bis-difluoramino alcohol | B.P. | $n_D^{20}$ | C | H | F | N | C | H | F | N |
|---|---|---|---|---|---|---|---|---|---|---|
| 2-bis(difluoramino) ethanol | [1] 40–42 | | 16.21 | 2.70 | 51.35 | 18.92 | 19.07 | 2.66 | 51.37 | 18.61 |
| 2,3-bis(difluoramino)-2-methyl-propanol-1 | [2] 43 | 1.3952 | 27.25 | 4.54 | 43.20 | 15.91 | 26.18 | 4.32 | 43.6 | 18.20 |
| 2,3-bis(difluoramino)-butanol-1 | [2] 58 | 1.3990 | 27.25 | 4.54 | 43.20 | 15.91 | 28.40 | 4.64 | 43.5 | 16.85 |
| 1,2-bis(difluoramino)-pentanol-3 [3] | | | 31.55 | 5.26 | 40.00 | 14.73 | | | | |
| 5,6-bis(difluoramino)-hexanol-3 [3] | | | 32.25 | 5.88 | 37.23 | 13.72 | | | | |

[1] 18 mm. [2] 1 mm. [3] Decomposed on attempted distillation.

*Analysis.*—Calculated for $C_3H_6F_4N_2O$: F, 46.89%. Found: F, 46.6%.

The transesterification reaction described above has been successfully completed a number of times. Table II presents the experimental data for a series of these reactions carried out under similar experimental conditions.

EXAMPLE IV

Reaction of methallyl alcohol with tetrafluorohydrazine

A 200 ml. round-bottom flask fitted with magnetic stirrer containing 7.2 g. (0.1 mole) methallyl alcohol in 50 ml. chlorobenzene was attached ice-water-condenser connected to a vacuum line. The flask was deaerated by repeated freezing and thawing after which tetrafluorohydrazine was added to give a maximum pressure of 703 mm. The flask was then heated to 85–90° C. for five and one-half hours. During this time the pressure was maintained between 500–700 mm. by the introduction of additional tetrafluorohydrazine as the pressure dropped to the minimum value. The excess tetrafluorohydrazine was removed by vacuum stripping. The flask was removed from the vacuum line and the contents distilled at reduced pressure. Chlorobenzene distilled at 46–48° C. (40 mm.) followed by 11.65 g. (66%) of a distillate, B.P. 45° C. (1 mm.). The product was identified by infrared spectroscopy and elemental analysis as 2-methyl-2,3-bis(difluoramino)propanol-1.

*Analysis.*—Calculated for $C_4H_8F_4N_2O$: C, 27.27%; H, 4.54%; F, 43.18%; N, 9.09. Found: C, 27.39%; H, 4.47%; F, 43.12%; N, 9.16.

EXAMPLE V

Reaction of 3-butenol-1 with tetrafluorohydrazine

Under similar experimental conditions 3.6 g. (0.05 mole) of 3-butenol-1 in 25 ml. chlorobenzene was reacted with tetrafluorohydrazine at 90° C. for a period of six hours. The alcohol adduct was isolated by vacuum distillation, B.P. 47° C. (0.8 mm.). A total 7.23 g. (82%) was obtained.

*Analysis.*—Calculated for $C_4H_8F_4N_2O$: C, 27.27%; H, 4.54%; F, 43.18%; N, 9.09. Found: C, 26.97%; H, 4.61%; F, 43.25%; N, 9.02%.

We claim:

1. A process for the preparation of alkanols containing difluoramino groups which comprises reacting (1) a compound selected from the group consisting of alkenols and the formate, acetate and trifluoroacetate esters thereof with (2) tetrafluorohydrazine, $N_2F_4$, at a temperature of from 50° C. to 300° C. and isolating the difluoramino alkanol.

2. A process as set forth in claim 1 in which the ester is an alkenyl trifluoroacetate.

3. A process as set forth in claim 2 in which the difluoramino alkanol is isolated from the corresponding ester by transesterification.

4. A process as set forth in claim 3 in which the transesterification is effected with methanol.

5. A process as set forth in claim 2 in which the bis(difluoramino)alkanol is isolated by hydrolysis.

6. A process as set forth in claim 5 in which the hydrolysis is effected by acids.

7. A process as set forth in claim 5 in which the hydrolysis is effected by alkali.

8. Difluoramino alkanols selected from the group consisting of compounds with the formula (1) 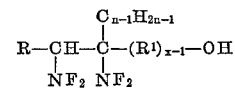

in which R is selected from the group consisting of hydrogen and lower alkyl, and $n$ is an integer from 1 to 5, and $R^1$ is selected from the group consisting of methylene and lower alkylene, $x$ is an integer from 1 to 5, and (2) the compound of the formula

9. 1,2-bis(difluoramino)ethanol.
10. 2,3-bis(difluoramino)-2-methyl-propanol-1.
11. 2,3-bis(difluoramino)butanol-1.
12. 1,2-bis(difluoramino)pentanol-3.
13. 5,6-bis(difluoramino)hexanol-3.
14. 1,2,4,5-tetrakis(difluoramino)pentanol-3.

References Cited

OTHER REFERENCES

Hoffman et al.: Chem. Reviews, vol. 62, pp. 12–18 (1962).

LELAND A. SEBASTIAN, *Primary Examiner.*

U.S. Cl. X.R.

149—19, 109; 260—487